W. V. TURNER.
ELECTROPNEUMATIC CONTROL VALVE MECHANISM.
APPLICATION FILED JUNE 29, 1910.
1,082,295.
Patented Dec. 23, 1913.
3 SHEETS—SHEET 1.
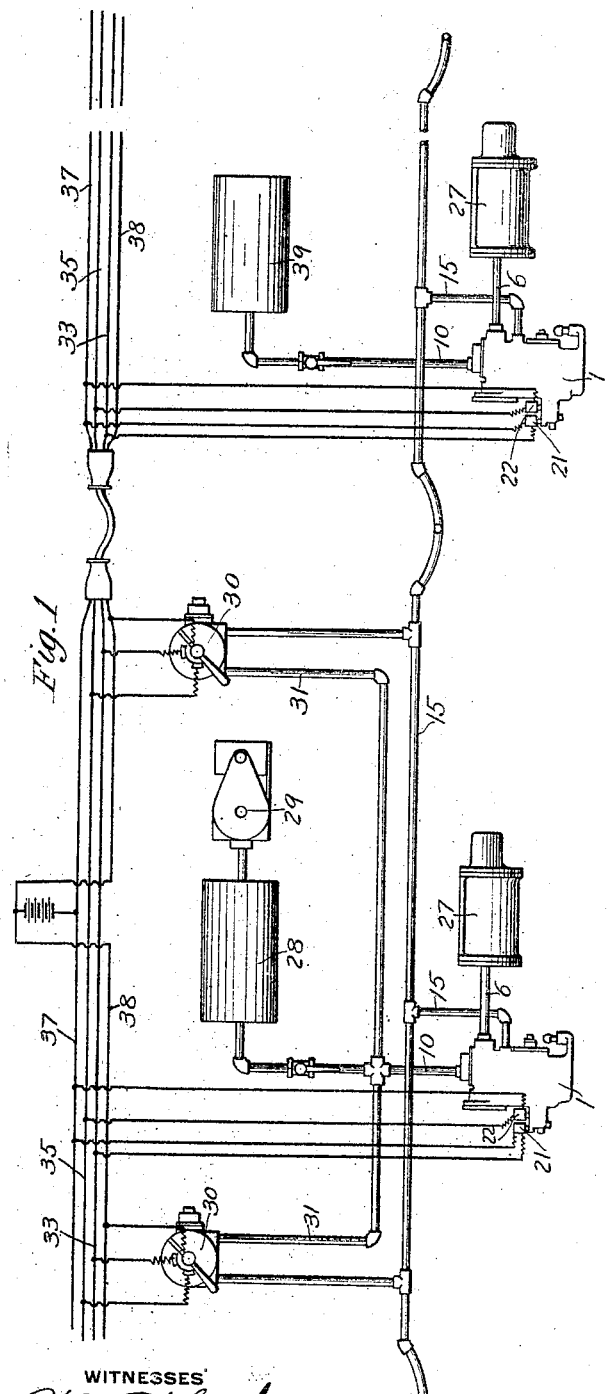
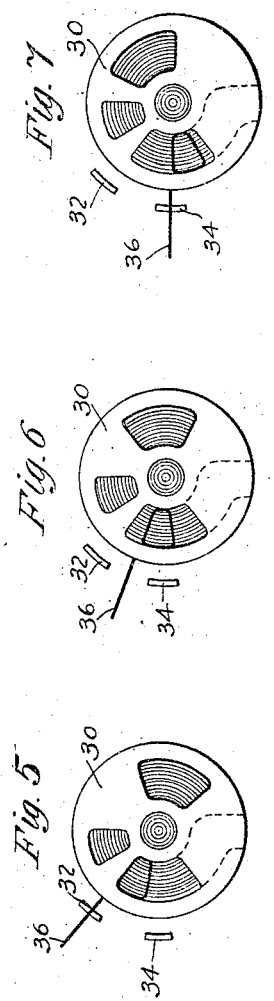

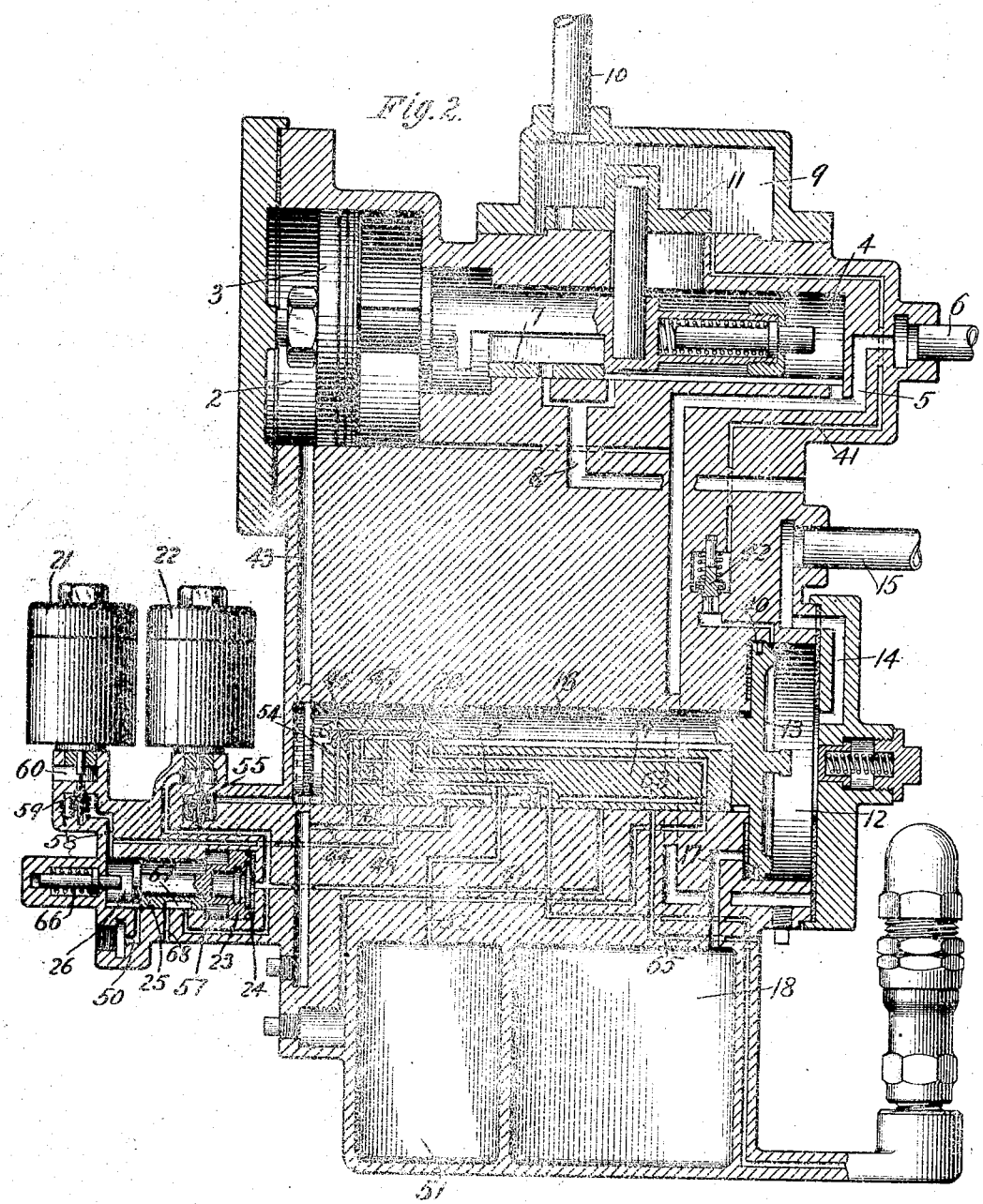

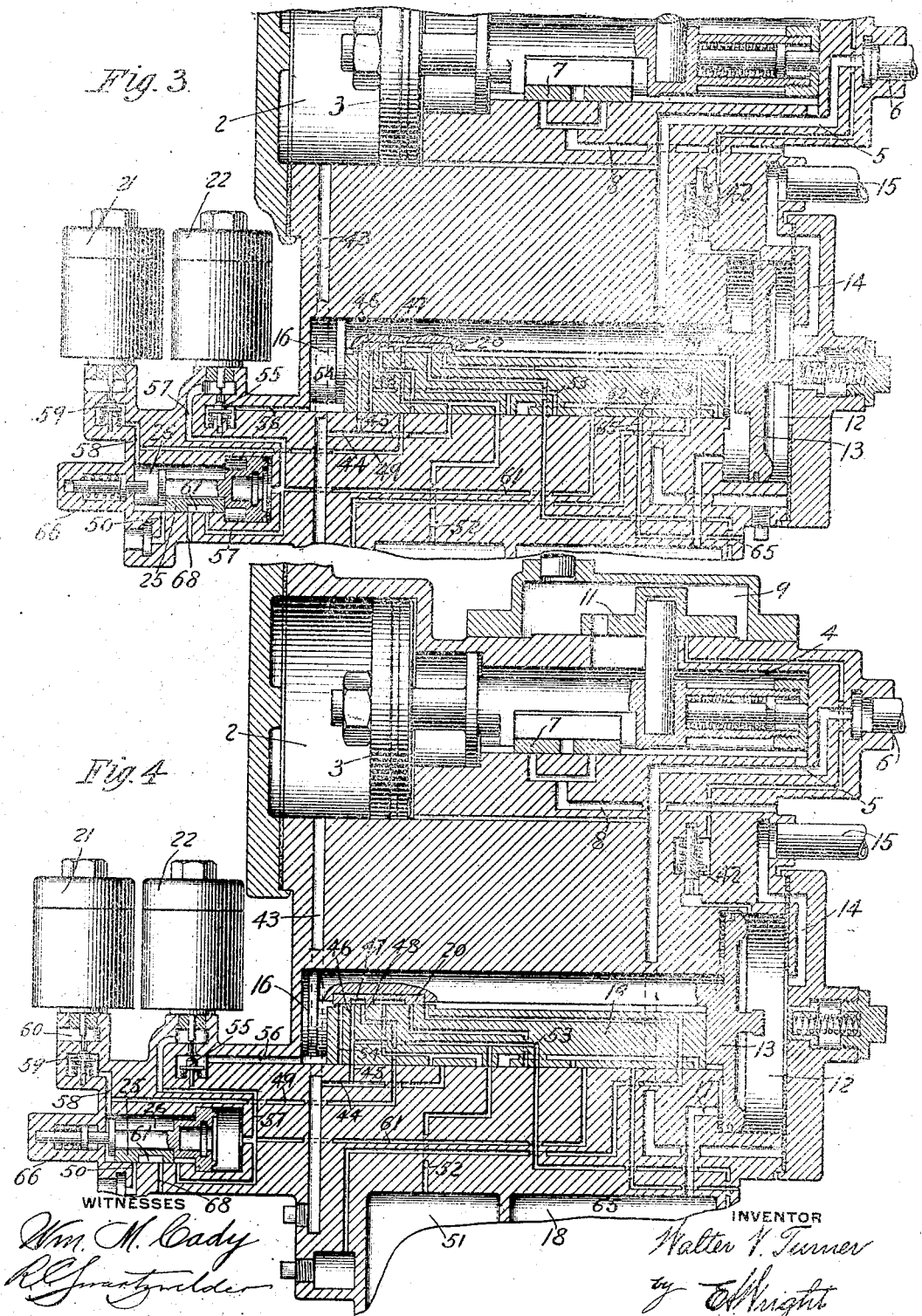

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

ELECTROPNEUMATIC CONTROL-VALVE MECHANISM.

1,082,295.   Specification of Letters Patent.   Patented Dec. 23, 1913.

Application filed June 29, 1910. Serial No. 569,478.

*To all whom it may concern:*

Be it known that I, WALTER V. TURNER, a citizen of the United States, residing at Edgewood, in the county of Allegheny and State of Pennsylvania, have invented new and useful Improvements in Electropneumatic Control-Valve Mechanism, of which the following is a specification.

This invention relates to fluid pressure brakes, and more particularly to an electropneumatic brake apparatus.

It has heretofore been proposed to provide an apparatus for controlling the brakes in which the valve mechanism for controlling the supply and release of air to and from the brake cylinder is governed by the opposing pressures of the brake cylinder and a chamber. With this apparatus the pressure in the chamber may be controlled either by an automatic valve device subject to variations in train pipe pressure or directly by manipulation of a brake valve. An apparatus of this character has many highly desirable features, for instance, the capability of maintaining the brake cylinder pressure at any pressure corresponding with the pressure supplied to the application chamber regardless of leakage from the brake cylinder and regardless of the travel of the brake cylinder piston.

The principal object of my invention contemplates providing a brake controlling mechanism of the above character, having a chamber the variations in pressure in which is adapted to control the pressure in the brake cylinder and electro-magnetic means for varying the pressure in said chamber.

In the accompanying drawings; Figure 1 is a diagrammatic view of a brake equipment for a motor car and trailer, showing my improvement applied thereto; Fig. 2 a diagrammatic sectional view of a brake control valve mechanism embodying my invention, showing the parts in full release position; Fig. 3 a similar view of a portion of the construction shown in Fig. 2, the parts being in automatic application position; Fig. 4 a similar view showing the position of the parts in electric application position; Fig. 5 a diagrammatic view of a combined brake valve and electric contact controller, showing the parts in electric release position; Fig. 6 a similar view showing the parts in electric lap position; and Fig. 7 a similar view with the parts in electric application position.

According to Figs. 2, 3, and 4, the electropneumatic brake controlling valve mechanism may comprise a casing 1 having a piston chamber 2 containing a movable abutment 3, a valve chamber 4 communicating through a passage 5 with a pipe 6 leading to the brake cylinder and containing a brake cylinder exhaust valve 7 operated by the movable abutment 3 for controlling an exhaust port 8, and a valve chamber 9 in open communication through a pipe 10 with a source of fluid under pressure and containing a supply valve 11 also operated by the movable abutment 3 for controlling the supply of fluid from the valve chamber 9 to valve chamber 4 and the brake cylinder. The casing 1 is also provided with a piston chamber 12 containing piston 13 of an automatic valve device, the piston being subject on its outer face to train pipe pressure admitted thereto through a passage 14 leading to the train pipe 15. The piston 13 is subject on its inner face to the pressure of a valve chamber 16 which is connected by a passage 17 to a pressure chamber 18. The valve chamber 16 contains a main slide valve 19 and a graduating slide valve 20 mounted on and having a movement relative to the main slide valve, the valve being operated by the piston 13. In addition to the above, an electro-magnetic control mechanism is provided preferably comprising a release magnet 21, an application magnet 22, and a valve device having a piston 23 contained in a piston chamber 24 and a valve 25 contained in a valve chamber 26 and adapted to be operated by the piston 23.

In Fig. 1 is shown diagrammatically a brake equipment for a motor car and trailer in which, on the head or motor car, brake cylinder 27 is connected to brake cylinder pipe 6, and the main reservoir 28, having the usual air compressor 29, to pipe 10. A combined brake valve and electric contact controller 30 may be provided at each end of the car having the usual supply pipe 31 from the main reservoir and having connection with the train pipe 15. The brake valve and controller is provided with a contact 32 connected to train wire 33 leading to the release magnet 21 and contact 34 connected to train wire 35 leading to application magnet 22. The other terminals of the application and the release magnets are connected to a common train wire 37. A train wire 38 provided with a suitable source of current is connected to the contact arm 36 of the brake controller and to the common train wire 37. On the trailer car the equipment is substantially the same except that a reservoir 39 is provided instead of the main reservoir 28.

In operation, the train pipe being charged with fluid under pressure, air flows around the feed groove 40 of the piston 13 and thence through passage 17 to the pressure chamber 18 charging the same to the standard train pipe pressure. On the trailer cars the reservoir 39 may be charged through a passage 41 from the train pipe, the passage containing a non-return check valve 42. With the piston 13 in release position as shown in Fig. 2 the piston chamber 2 is connected to the atmosphere through passage 43, passage 44, port 45, port 46 in the main slide valve 19, cavity 47 in the graduating valve 20, port 48 in the main slide valve, and passage 49 to valve chamber 26 which is open to the exhaust port 50. Thus the movable abutment 3 is maintained in release position, with the brake cylinder open to the atmosphere through the passage 8. An additional chamber 51 may be connected to the passage 43, through a passage 52 and port 53 in the main valve, leading to port 46, for the purpose of increasing the capacity of the piston chamber 2.

If a gradual reduction in train pipe pressure is made, the piston 13 is shifted to automatic application position, as shown in Fig. 3, in which a through port 54 in the main valve is brought into register with port 45. Air is thus supplied from the valve chamber 16 and the pressure chamber 18 to the application chamber 2. The movable abutment 3 is thereupon shifted to application position and fluid under pressure is supplied from the valve chamber 9 to the valve chamber 4 and the brake cylinder. Upon equalization of the pressure in the pressure chamber with the reduced train pipe pressure, by flow to the application chamber, the piston 13 is shifted sufficiently to cause the graduating valve to lap the supply port 54. Further reductions in train pipe pressure may be made for the purpose of further supplying air to the brake cylinder. Any leakage from the brake cylinder is compensated for by the movement of the abutment 3 to open the supply valve 11.

If it is desired to effect an application of the brakes by means of the electric mechanism, the brake valve handle is turned to the position shown in Fig. 7, in which the contact arm 36 connects with the contact 34. The application magnet 22 is thus energized and opens the application valve 55 which permits fluid to flow from the valve chamber 16, from passage 56 to passage 57.

Passage 57 communicates with the outer face of the piston 23, so that fluid pressure in passage 7 operates to shift the piston 23 to its outer position, in which the valve 25 closes the exhaust port 50 and uncovers passage 57. Fluid may therefore flow from passage 57 to valve chamber 26 and thence through passages 58 and 49 to the main slide valve 19. Port 48 registers with passage 49, so that fluid flows through port 48, cavity 47 and port 46 to passages 44 and 43. Fluid under pressure is thus supplied to the piston chamber 2 and the piston 3 then operates the supply valve 11 to admit fluid to the brake cylinder. By turning the contact arm 36 to electric lap position, as shown in Fig. 6, the application magnet is deënergized and the valve 55 closes.

If it is desired to release the brakes electrically, the contact arm 36 is turned to electric release position, as shown in Fig. 5, in which the contact arm connects with the contact 32. The release magnet 21 is thus energized and the release valve 59 is opened. Air is then vented from the piston chamber 2 through passages 43 and 44, port 45, port 46, cavity 47, port 48 and passages 49 and 58 to exhaust port 60 and the abutment 3 is thereupon shifted to release position and fluid is released from the brake cylinder.

By providing the piston 23 and valve 25, when air is supplied to the application chamber by operation of the electrically controlled mechanism, the movement of the valve 25 prevents escape of air through the exhaust port of the automatic valve device. If with the brakes applied electrically an automatic application is effected, in order to permit of the subsequent release of the brakes pneumatically, the piston 23 must be shifted to its normal position. For this purpose a passage 61 is provided, leading from the outer face of piston 23 to the seat of the main slide valve and in service application position of the slide valve said passage registers with a port 62 in the slide valve opening into a passage 63. The passage 63 also has a port opening 64 which in this position registers with an atmospheric exhaust passage 65, so that fluid is vented from the outer face of the piston 23 causing the same to shift the valve 25 to its outer position in which the exhaust port 50 is open to the valve chamber 26. It will now be evident that upon operating the automatic valve device to release the brakes the exhaust port of the automatic valve device will be open so as to permit the release of air from the application chamber.

Preferably a yielding resistance stop device 66 is provided for the purpose of returning the valve 25 to a position in which the port 57 is lapped upon making an electric application, after equalization of fluid pressures on the piston 23, so that in case an automatic application is made after an electric application, communication from the valve chamber 26 will be cut off from passage 57, which is open to the atmosphere in service application position of the valve 19. If the passage 57 is left open to said valve chamber, it might prevent the pressure from building up in the valve chamber sufficiently to shift the piston 23 to its outer position in which the exhaust port 50 is open.

A cavity 67 is provided in the valve 25 which is adapted to connect the port 57 with an exhaust port 68 in the outer position of the valve, so as to insure the maintenance of the piston 23 in its outer position after the automatic valve device is moved to release position.

Having now described my invention, what I claim as new and desire to secure by Letters Patent, is:—

1. In a fluid pressure brake, the combination with a brake cylinder, of a valve for controlling the supply of air to the brake cylinder, an application chamber, a movable abutment subject to the pressure of the application chamber for operating said valve, an automatic valve device operated by variations in train pipe pressure for supplying fluid to said chamber, and an electrically controlled valve for releasing fluid from said chamber, the passage through which the electrically controlled valve releases fluid from the chamber being controlled by said automatic valve device.

2. In a fluid pressure brake, the combination with a brake cylinder, of a valve for controlling the supply of air to the brake cylinder, an application chamber, a movable abutment subject to the opposing pressures of the application chamber and the brake cylinder for operating said valve, an automatic valve device operated by variations in train pipe pressure for supplying and releasing fluid to and from said chamber, and an electrically controlled valve for also releasing fluid from said chamber, the passage through which fluid is electrically released from the chamber being controlled by said automatic valve device.

3. In a fluid pressure brake, the combination with a brake cylinder, of a valve for controlling the supply of air to the brake cylinder, an application chamber, a movable abutment subject to the opposing pressures of the application chamber and the brake cylinder for operating said valve, an electrically controlled valve for supplying fluid to said chamber, and an automatic valve device operated by variations in train pipe pressure for releasing fluid from said chamber, and a valve mechanism operated by the flow of fluid from said electrically controlled valve to said chamber for closing the exhaust of said automatic valve device.

4. In a fluid pressure brake, the combination with a brake cylinder and a train pipe, of a valve for controlling the supply of air to the brake cylinder, an application chamber, a movable abutment subject to the opposing pressures of the application chamber and the brake cylinder for operating said valve, a valve mechanism operated by variations in train pipe pressure for varying the pressure in said chamber, and electrically controlled means for also varying the pressure in said chamber.

5. In a fluid pressure brake, the combination with a train pipe and brake cylinder, of a valve for controlling the supply of air to the brake cylinder, an application chamber, a movable abutment subject to the opposing pressures of the application chamber and the brake cylinder for operating said valve, an automatic valve mechanism subject to variations in train pipe pressure for governing the supply and release of air to and from the brake cylinder, electrically controlled means for varying the pressure in said chamber, and a valve device operated by said electrically controlled means for controlling the exhaust port of said automatic valve mechanism.

6. In a fluid pressure brake, the combination with a train pipe and brake cylinder, of a valve for controlling the supply of air to the brake cylinder, an application chamber, a movable abutment subject to the opposing pressures of the application chamber and the brake cylinder for operating said valve, an automatic valve mechanism subject to variations in train pipe pressure for supplying and releasing air to and from said chamber, electrically controlled means for also controlling the supply and release of air to and from said chamber, and a valve device governed by said electrically controlled means for controlling the exhaust outlet of the automatic valve device.

7. In a fluid pressure brake, the combination with a train pipe and brake cylinder, of a valve for controlling the supply of air to the brake cylinder, an application chamber, a movable abutment subject to the opposing pressures of the application chamber and the brake cylinder for operating said valve, an automatic valve mechanism subject to variations in train pipe pressure for supplying and releasing air to and from said chamber, electrically controlled means for also controlling the supply and release of air to and from said chamber, and a valve device adapted to be operated by said electrically controlled means and the automatic valve device for controlling the exhaust outlet of the automatic valve device.

8. In a fluid pressure brake, the combination with a brake cylinder and train pipe, of valve means for controlling the supply and release of air to and from the brake cylinder, a chamber, a movable abutment subject to the opposing pressures of the brake cylinder and said chamber for operating said valve means, an automatic valve device subject to variations in train pipe pressure for supplying and releasing fluid to and from the chamber, an electrically controlled valve mechanism for also varying the pressure in said chamber, and means for closing the release port of the automatic valve device upon operation of the electrically controlled mechanism.

9. In a fluid pressure brake, the combination with a brake cylinder and train pipe, of valve means for controlling the supply and release of air to and from the brake cylinder, a chamber, a movable abutment subject to the opposing pressures of the brake cylinder and said chamber for operating said valve means, an automatic valve device subject to train pipe pressure for supplying air to said chamber and having a release position for connecting said chamber to the exhaust, an electrically controlled valve mechanism for also controlling the supply of air to said chamber, and means operated by the flow of air from said electrically controlled valve mechanism for closing the exhaust of the automatic valve device.

10. In a fluid pressure brake, the combination with a brake cylinder and train pipe, of valve means for controlling the supply and release of air to and from the brake cylinder, a chamber, a movable abutment subject to the opposing pressures of the brake cylinder and said chamber for operating said valve means, an automatic valve device subject to train pipe pressure for supplying air to said chamber and having a release position for connecting said chamber to the exhaust, an electrically controlled valve mechanism for also controlling the supply of air to said chamber, a valve device for controlling the exhaust from the automatic valve device and the supply from the electrically controlled valve mechanism and operated by the flow of air from said electrically controlled valve mechanism for closing the exhaust from the automatic valve device, and means for moving said valve means to cut off the supply port from the electrically controlled valve mechanism upon equalization of pressures on said valve device.

In testimony whereof I have hereunto set my hand.

WALTER V. TURNER.

Witnesses:
 CLYDE V. McCURDY,
 A. M. CLEMENTS.